United States Patent [19]

Napier et al.

[11] Patent Number: 5,225,085

[45] Date of Patent: Jul. 6, 1993

[54] APPARATUS AND PROCESS FOR THE SEPARATION AND RECLAMATION OF SELECTED COMPONENTS IN GREASE TRAP WASTE

[76] Inventors: Laksir P. Napier, 7141 N. 16th St. #27, Phoenix, Ariz. 85020; Tommy L. Mortensen, 19 E. Canterbury Ct., Phoenix, Ariz. 85022; Dawn F. Abbey, 7141 N. 16th St. #27, Phoenix, Ariz. 85020

[21] Appl. No.: 789,066

[22] Filed: Nov. 7, 1991

[51] Int. Cl.$^5$ .............................. B03D 3/00; C02F 1/40
[52] U.S. Cl. .................................. 210/705; 210/724; 210/776; 210/800; 210/121; 210/187; 210/145.1; 210/207; 210/252; 210/525; 210/532.1; 210/538
[58] Field of Search ............... 210/540, 724, 725, 744, 210/702, 703–705, 776, 787–789, 800, 803, 806, 121–129, 175, 182, 187, 194, 195.1, 198.1, 207, 252, 259, 260, 513, 525, 532.1, 538

[56] References Cited

U.S. PATENT DOCUMENTS

| | | | |
|---|---|---|---|
| 3,909,407 | 9/1975 | Heisey | 210/724 |
| 4,007,117 | 2/1977 | Smith et al. | 210/725 |
| 4,880,533 | 11/1989 | Hondulas | 210/744 |
| 5,006,239 | 4/1991 | Mishra | 210/540 |

*Primary Examiner*—Frank Sever
*Attorney, Agent, or Firm*—Gregory J. Nelson

[57] ABSTRACT

A process for separating the grease, solids and water components from grease such as grease traps and fry grease. The grease is collected and introduced into a primary holding tank to effect primary crude separation. The grease is removed to a second stage separator for further concentration. The water and solids are separately directed to a second stage to separate these components. The separated water is treated suitable for discharge into a sewer. The solids are dried and the solids and grease are then suitable for re-use. In the preferred embodiment, the separators are centrifuges. Heating of the grease may also be necessary to achieve proper viscosity for handling and to remove bacteria.

22 Claims, 4 Drawing Sheets

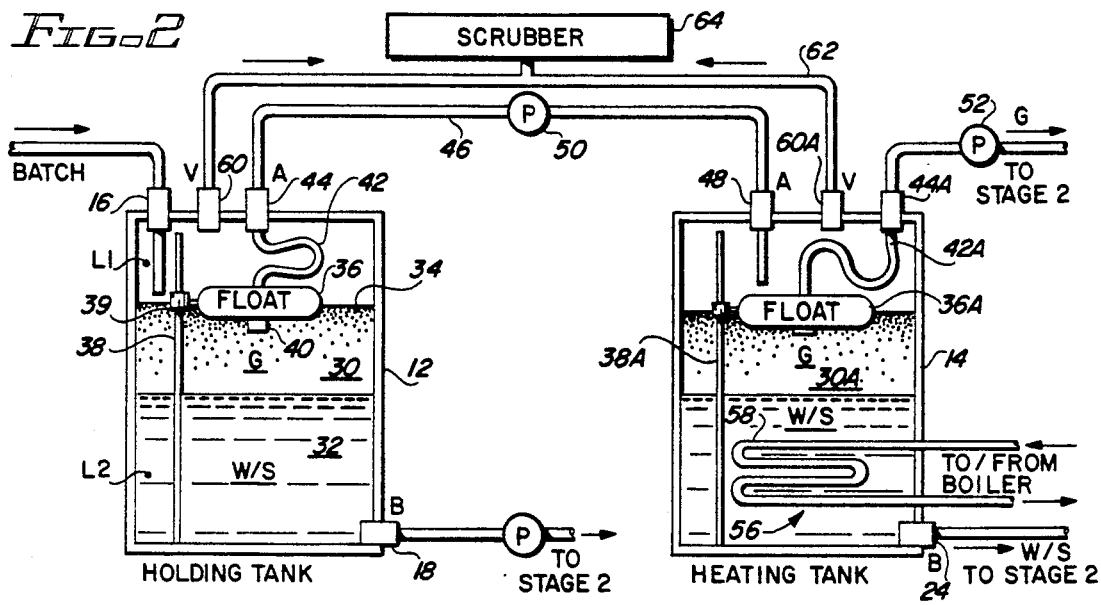
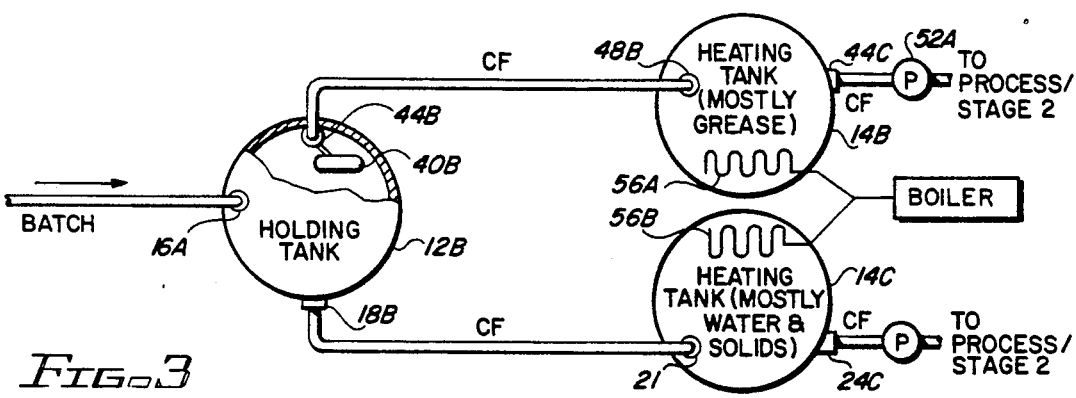
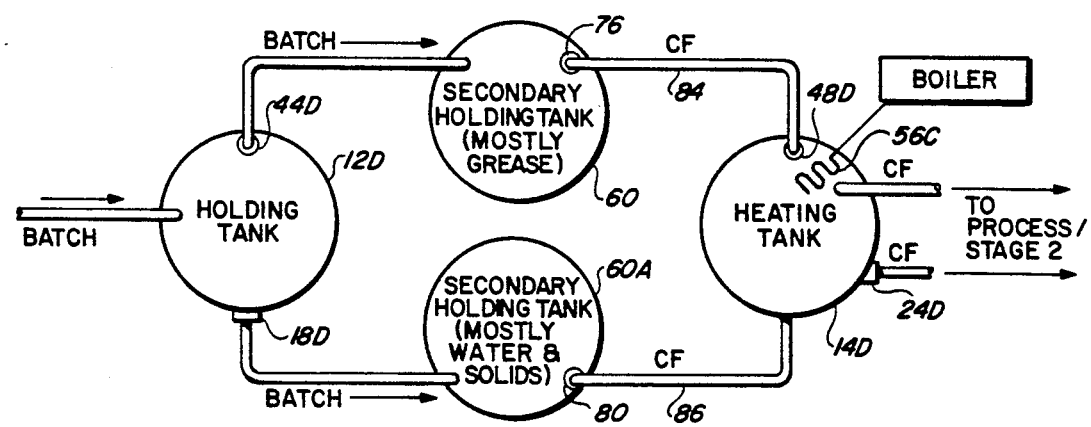

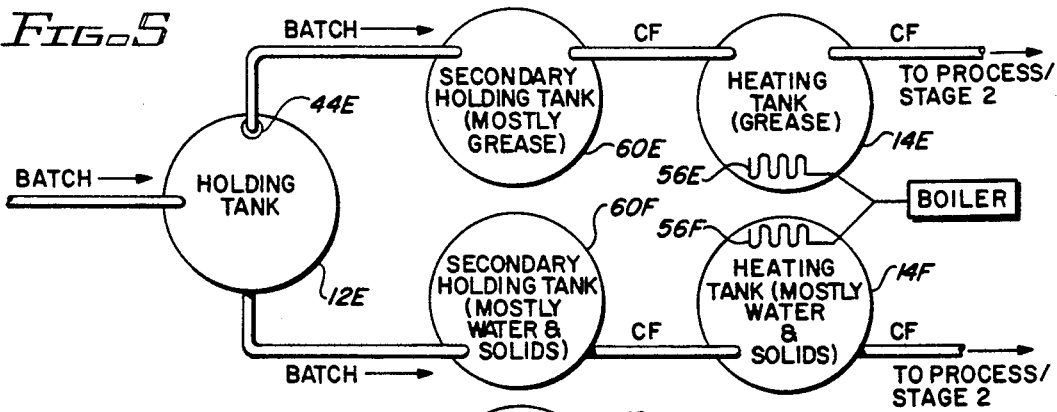
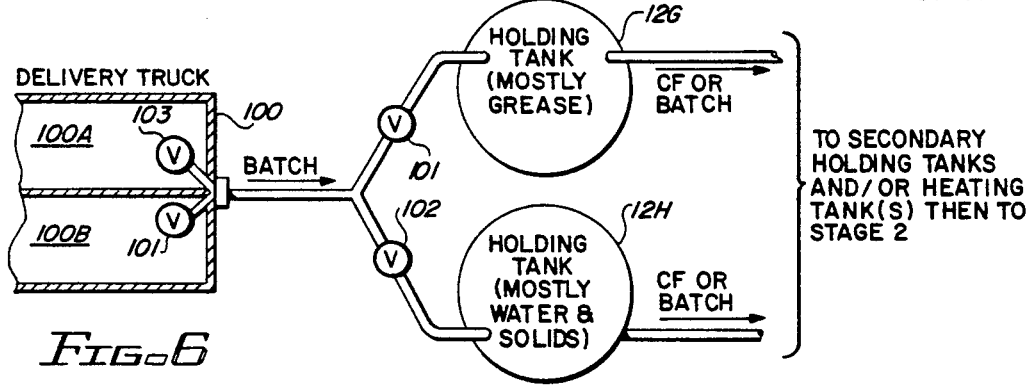
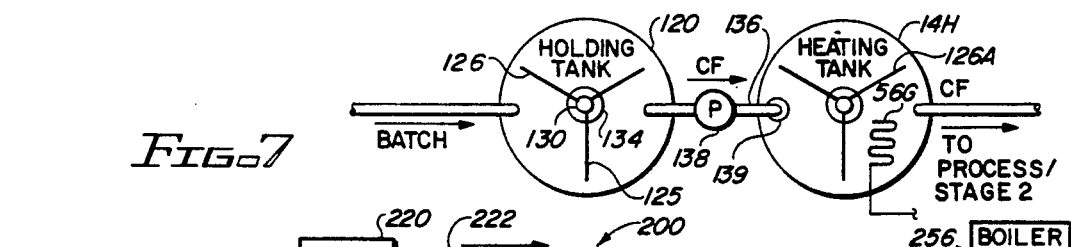
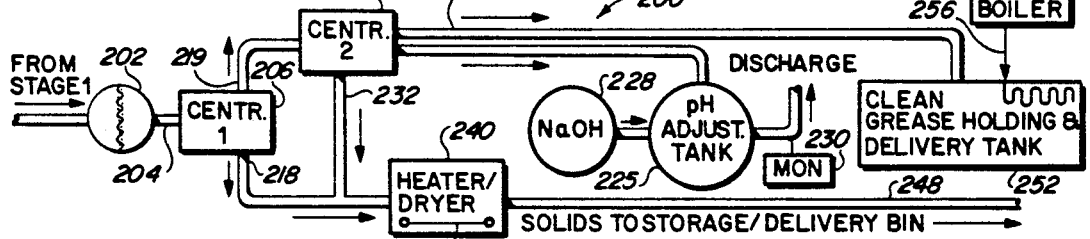
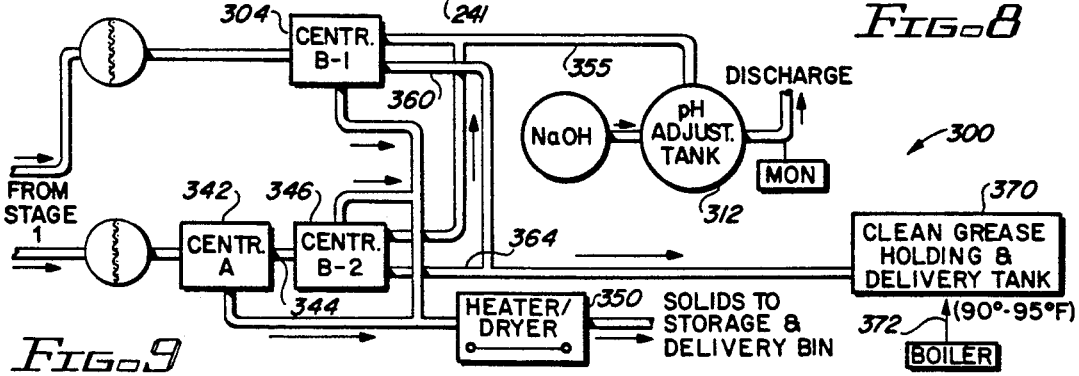

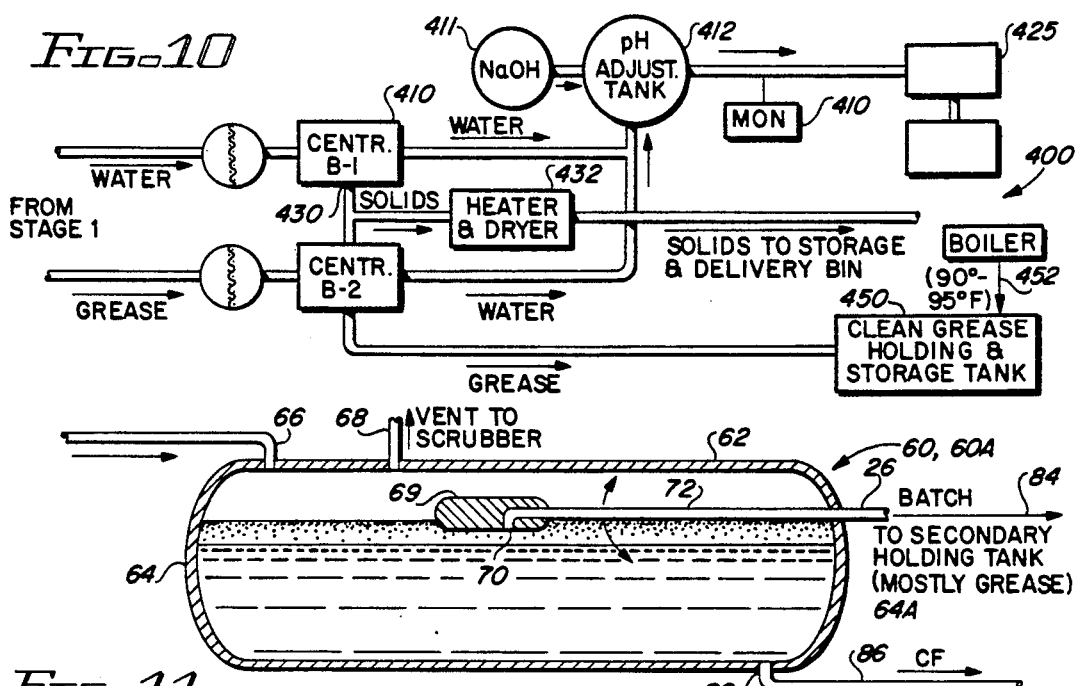
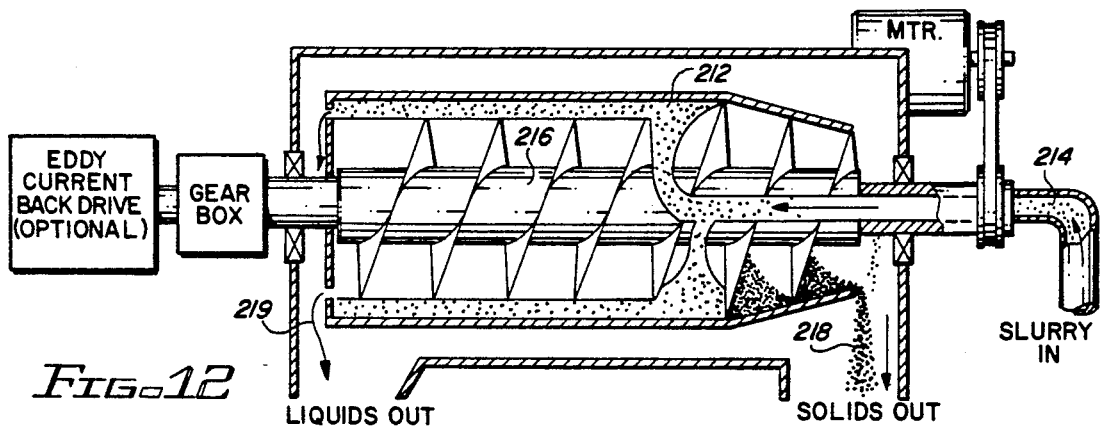
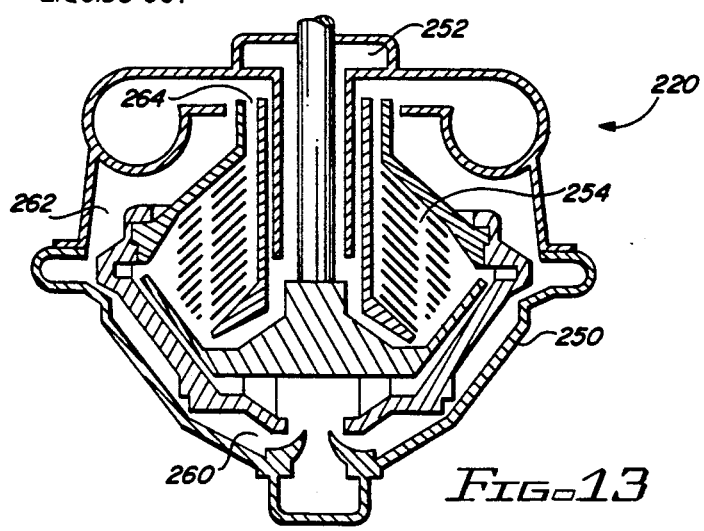

APPARATUS AND PROCESS FOR THE SEPARATION AND RECLAMATION OF SELECTED COMPONENTS IN GREASE TRAP WASTE

FIELD OF THE INVENTION

The present invention relates to a process and apparatus for separation of grease, solids and water from a mixture of these components and more particularly relates to an apparatus and process for separating grease trap waste and other restaurant and commercial grease waste into their principal components, namely grease, water and solids, and reclaiming at least the solids and grease components.

Grease is a natural product resulting from the preparation of foods. Restaurants produce substantial quantities of grease which is generally either collected in a grease trap or a vat or tank for holding for subsequent removal. Thus, the term "grease" or "grease trap waste" as used herein is intended to mean waste substances such as waste trap grease, cooking grease, fry grease or a combination of these substances. Grease trap waste is a mixture of cooking grease (animal and/or vegetable), food, oils and fat, water and food waste solids which must be treated in some manner and such waste cannot be discharged into municipal sewer systems. Typically grease trap waste is about 15% to 40% grease and about 10% to 15% solids, with the balance being water. The grease content may be higher if the grease is preferentially pumped from the grease trap leaving most of the water. Fryer grease is grease and/or oil from french fryers and other similar cooking equipment. Cooking establishments are required to change this grease frequently and often dump the old grease into a drum or vat for pick-up and transportation. Used grease is often sold to rendering plants or other processing companies.

Several approaches can be found in the prior art with respect to the disposal of grease, oils, fats and other contaminants which are discharged into greases traps or holding vats of food preparation establishments. One common method for grease trap waste is to periodically evacuate the traps or vats and transport the waste material to a remote landfill location for disposal as the grease cannot legally be introduced into existing waste water or septic systems. In some cases, the removed grease may be subjected to some type of primary treatment at the remote landfill location. Generally simple grease separating systems are utilized in which the grease is allowed to collect on the surface of the water by flotation and then the grease is removed. The remaining water may then be discharged into holding tanks or ponds, land fills or, in some cases, into waste water systems. However, with systems of this type, substantial quantities of grease and solids may pass with the water into the sewer system and holding ponds. The grease and solids which are carried over in this manner may pose an environmental problem as well as interfering with treatment of the water. Economic loss results since grease and solids have a secondary value in the reclamation market as they are used for various products such as animal foods.

At a remote location, the fryer grease may also be treated by filtering and heating. The grease may then be placed in cone-bottom tanks to settle and stratify. Most of the water is drawn from the bottom of the tanks and the layer of grease removed as indicated and sold to brokers or end users. Fryer grease usually contains 10% or less water plus food solids.

Another approach to dealing with complex proteins, cellulose starches, fats, solids and other grease and other contaminants in grease trap waste is to provide some type of flushing and liquid culture injection system. Processes of this type will serve to at least minimize clogging problems as these systems inject water into the grease trap along with some type of bioactive culture. The liquid culture liquifies and digests contaminants so that the contaminants may be flushed into the sewer system. However, with systems of this type, certain environmental objections may occur and economic loss results since the grease and solids content is simply discharged to waste.

Although, as demonstrated above, various methods of dealing with the collection and disposal of grease exist, there nevertheless exists a need in the art for an effective apparatus and process for the separation of grease solids and water from grease trap waste and fryer grease waste. The apparatus and process disclosed herein provides an effective, efficient and economical method for separating grease, water and solids from one another resulting in reclaimed components which are marketable. Further, the apparatus and process of the present invention alleviates many of the disposal and ecological problems attendant to conventional grease handling and grease treating methods.

The above and other objects and advantages of the present invention will become more apparent from the following specification, claims and drawings in which:

FIG. 2 is a view partly in cross section and partly schematic showing the holding and heating tanks of FIG. 1;

FIGS. 3 through 7 show in schematic representation various arrangements for the initial treatment stage carried out by the system of the present invention;

Figure 1:
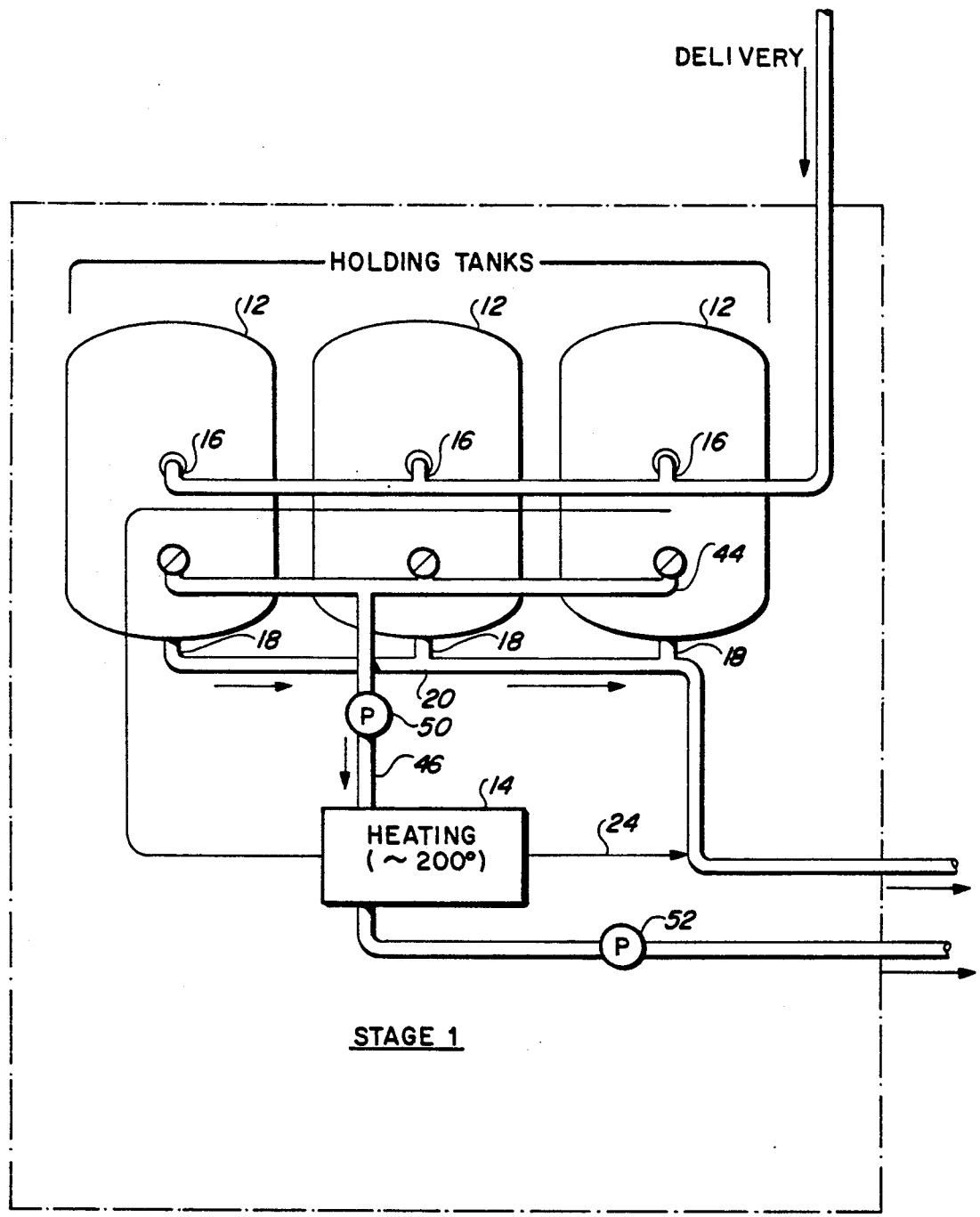
FIG. 1 is a schematic illustration of one embodiment of the initial stage of the system of the present invention.

FIGS. 8, 9 and 10 schematically show various arrangements for the second or final treatment stage;

FIG. 11 shows a cross sectional view representative of the secondary holding tank or heating tank;

FIG. 12 is a cross sectional view showing one type of centrifuge used primarily for treatment of water and solids; and FIG. 13 shows another type of centrifuge used for solids removal from water.

The treatment and separation system of the present invention basically is a two-stage system. In stage 1, the material to be treated is delivered to the system, introduced into the system and subjected to primary treatment. The primary treatment may include sedimentation and heating. In stage 2, processing to separate solids, water and grease occurs using centrifuges as the preferred separation means.

Throughout the specification, similar numerals are used to designate same or similar elements with a letter appended for differentiation throughout the views.

Referring to FIG. 1, a preferred form of the initial or first stage is shown in which the initial stage is generally indicated by the numeral 10 and includes a plurality of holding tanks 12 and a heating tank 14. The tanks 12 and 14 may be of any conventional type or shape and preferably are steel or other material resistive to corrosion and heat. Each of the holding tanks 12 has an inlet 16 which is adapted to receive the material to be processed. The material to be processed is transported to the processing location by tanker trucks which periodically evacuate the grease and water from restaurant grease traps and other grease receptacles. As indicated, the grease may be of a mixture of various types of grease or oil waste which typically has about 15% to 40% grease and 10% to 15% solids with the balance of material being water. The material to be treated is periodically pumped in batch fashion into holding tanks 12. The inlets 16 to tanks 12 are preferably located at an outlet fitting in or near the upper part of the tank.

Usually a single tank 12 will be filled at a time and then allowed to settle for a period of time while another tank 12 is being filled. Appropriate valving, not shown, is provided in the system for directing and regulating the in-flow.

Each tank 12 has an outlet 18 located at or near the bottom of the tank. Water outlets 18 are commonly connected by line 20 and the water discharged is directed to second stage processing. Line 20 discharges near the bottom of each tank 14 and directs the flow containing primarily water and solids to the second stage. Generally the particular tank 12 which will be placed on line will first be allowed a sedimentation period after it is filled. Thus, with a plurality of tanks 12, the contents of one or more tanks will be allowed to settle while another is receiving delivered material for processing. Generally crude settling and separation will normally take place in approximately 10-30 minutes. Again, appropriate valving will be utilized to isolate a tank 12 when receiving material or when in a sedimentation phase.

As settling occurs, the material containing grease will tend to stratify with the grease forming a layer 30 above an aqueous solids-containing mixture 32 as seen in FIG. 2. Grease from layer 30 is selectively pumped from holding tank 12 into heating tank 14 via line 46. Since the grease level 34 will rise or fall during processing, a float 36 is vertically guided by ring 39 along rod 38 so that the float is free to maintain a position substantially at the upper surface of the grease strata 30. The float carries an inlet 40 connected via flexible hose 42 which is coupled to tank outlet 44 in the upper surface of the tank. The tank outlet 44 communicates via conduit 46 with the inlet 48 to the holding tank 14. Thus, grease along with some water and solids is transferred from grease strata 30 of the receiving tank 12 under the influence of pump 50 and discharged into the upper end of the heating tank 14.

Tank 14 has a float 36A which is of similar construction to float 36 vertically guided along rod 38A. Conduit 42A is flexible and communicates with the inlet 40A carried by float 36A to transfer grease from the grease strata 30A to discharge 44A under the influence of pump 52. The flexible hoses 42 and 42A accommodate variations in the tank level. Appropriate level alarms $L_1$ and $L_2$ may be installed in the tanks 12 and 14 to initiate and discontinue pumping as the level increases or decreases to predetermined levels. In some applications the heating tank will contain mostly grease and the contents can be directly pumped from a discharge located at an intermediate elevation.

A heat exchanger 56 is located in the lower portion of tank 14 in the area occupied by the mixture of water and solids. In colder operating conditions, it is preferable to heat the contents to over 90° F. to melt the grease to make it easier to pump and in some cases it may be desirable to heat the material to over 170° F. to kill most bacteria. Heat exchanger 56 consists of a plurality of coils 58 through which a suitable heating exchange fluid is circulated. The heat exchange fluid may be steam, hot water or flue gas from any convenient heat source. Alternatively, the heat exchanger may consist of an electrical resistance heating unit suitably emersed in the lower portion of tank 14.

Each of the tanks 12 and 14 are provided with a vent 60 and 60A, respectively, which vents are located in the upper surface of the tank and communicate with the vapor which collects in the upper or head end of the tank above the grease. The vents are interconnected by conduit 62 which is, in turn, connected to a scrubber 64 which may be of the dry or wet type and which is selected to eliminate any environmentally objectionable contaminants or odors. The purpose of the initial stage is to receive the material, allow some sedimentation to occur so that primary separation of grease and water occurs. Heating may also take place so the material is elevated to a suitable temperature for subsequent processing. The heating system is designed in accordance with the volume of the system to accommodate flow and maintain the required temperature.

Once primary stage separation and heating has occurred, the grease is pumped from discharge 44A of tank 14 to process stage 2 and the water and solids are pumped from the lower portion of tank 12 at line 20 to process stage 2. Similarly, water and solids are pumped from tank 14 and are also directed to stage 2 by line 24 which connects with line 20.

FIG. 3 shows a schematic of a variation of the initial stage similar to that shown in FIG. 1. In the FIG. 3 embodiment, components similar to those described above are identified with the same numerals with the letter "B" or "C" appended. The initial holding tank 12B receives a mixture of grease and water at inlet 16A from a source such as a tanker truck on a batch basis. The holding tank 12B is constructed generally as has been described with reference to FIGS. 1 and 2 having lower outlet 18B for water and an elevated outlet 44B for grease which outlet is connected to a floating inlet 40B which floats at or near the surface of the grease within the tank. Heating tanks 14B and 14C are constructed as has been described with reference to tank 14 as shown in FIGS. 1 and 2.

Grease separated in tank 12B is directed to the inlet 48B of tank 14B and the water from the holding tank 12B is directed to the water inlet 21 of tank 14C which inlet depends in the tank adjacent the bottom of the tank. Each of the tanks 14B and 14C are heating tanks provided with a heat exchange elements 56A and 56B, respectively, which will heat the contents of the tanks. The separated grease discharged from tank 14B at pump 52A is directed to the second stage of the process as will be described hereafter and similarly, the water containing solids discharged from outlet 24C in the lower tank 14C will be subjected to subsequent separation treatment.

The embodiments of FIGS. 4 and 5 show other process variations that may be incorporated into the initial stage of the system. In FIG. 4, the holding tank 12D is as has been described above having an upper discharge 44D which discharges grease removed from the floating grease layer separated within the tank. Water and solids are discharged from the lower part of the tank at outlet 18D. Holding tank 12D is periodically batch charged with the grease mixture and after a predetermined settling time, the grease and subjacent water are pumped on a batch basis to the secondary holding tanks 60 and 60A.

The grease discharged at outlet 44D is directed to holding tank 60 and the liquid is directed to secondary holding tank 60A which tanks may be of various configurations. FIG. 11 is a cross sectional view illustrating a typical construction for the holding tanks 60 and 60A. For purposes of illustration, the holding tanks are shown as being generally horizontal and having a cylindrical side wall 62 and opposite end walls 64 and 64A defining an internal chamber. An inlet 66 is shown in the position of the upper surface of the side wall as is a vent 68 for directing collected vapors to a scrubber. A float 69 such as a hollow sphere of stainless steel or brass is positioned in the chamber and supports an inlet 70 which is connected via flexible conduit or hose 72 to grease outlet 76. Thus, the float maintains the inlet 70 at substantially the surface of the grease layer or strata. An outlet or discharge 80 is provided near the bottom of the tank at end wall 66 for discharge of water and solids.

Thus, in the system shown in FIG. 4, line 84 is connected to the grease outlet 76 of the secondary holding tank 60 and conduit 86 is connected to the water discharge 80 of the secondary holding tank 60A. Line 84 directs the grease to the upper inlet 48D of heating tank 14D. Similarly, the solids-containing water is directed to the lower portion of heating tank 14D so separation is maintained. Tank 14D is substantially similar to tank 14 as shown in FIGS. 1 and 2. Settling and heating occurs in tank 14D. The grease heated by heat exchange element 56C is discharged from tank 14D at outlet 44D and water and solids are discharged at outlet 24D and both are subject to second stage treatment as will be described hereafter. Generally flow rates will be regulated so the flow conforms to the approximate ratio of grease to water. The water flow will normally be approximately two-thirds of the total flow and the grease flow will be approximately one-third of the total flow rate. Float valves or limit switches are incorporated in the tank interior to control pumping so pumping occurs only between predetermined liquid levels as is well known.

In the system variation shown in FIG. 5, the primary holding tank 12E is constructed as has been described above which tank receives batch loading of a grease mixture from a transport truck or other source. The grease is withdrawn at outlet 44E from tank 12E and is directed to a secondary holding tank 60E and thereafter directed to heating tank 14E. Similarly, the water-containing solids withdrawn from the lower portion of holding tank 12E and are directed to secondary tank 60F and thereafter to a heating tank 14F. The holding tanks 60E and 60F are periodically charged and after a settling period, continuous transfer of grease and water occurs from both the secondary holding tanks and the heating tanks. The secondary holding tank affords additional separation primarily through sedimentation as they will not be disturbed by the periodic batch loading of tank 12E.

The grease discharged from the heating tank 14E and the water discharged from the heating tank 14F are subjected to subsequent secondary treatment as will be explained. A single heat source may provide the energy to heat exchanger elements 56E and 56F in the respective heating tanks. The principal difference between the embodiment of FIG. 4 and that of FIG. 5 is that the grease and water each has its own heating tank. Heating occurs to maintain the proper viscosity in cold areas and also to kill bacteria.

In the system modification of FIG. 6, the process is entirely a batch process. Holding tanks 12G and 12H periodically are charged with grease and water respectively. The source 100 of the grease, water and solids material to be processed is shown as a delivery tank 100 in which some separation of the grease and water occurs. This occurs either by allowing adequate residence time so separation occurs within the tank or by selective pumping from compartments 100A, 100B in the tank 100. In this case, the grease is collected so the grease traps are pumped so the grease component is placed into one compartment 100A containing substantially all grease and liquid is pumped into the other compartment 100B. In this manner, the initial holding tank for separation of grease and liquid may be eliminated and holding tanks 12G and 12H may be charged respectively with grease and liquid by selectively actuating valves 101, 102, 103 and 104. Heating may take place in the holding tanks 12G, 12H or in a subsequent tank prior to stage 2 treatment.

In FIG. 7, the primary stage of the process is shown in which batch loading of the process occurs. In the process shown in this embodiment, the initial treatment tank 120 receives the material to be processed in batch form. Tank 120 is of any conventional shape and has one or more agitators 125 within the tank. The agitators are shown as a plurality of blades 126 mounted on the axially depending shaft 130 driven by a suitable drive such as a hydraulic motor, electric motor or gear box 134. The agitator maintains the grease and liquid, agitated with the grease and solids suspended in the liquid. In some cases, it may be desirable to mix the contents prior to heating and primary settling and subject to mixture of grease, water and solids to secondary treatment. The uniform mixture is pumped via line 136 and pump 138 to the heating tank 14H which is has been described above but has a single inlet 139 for the mixture at an intermediate elevation in the tank. The mixture is subject to heating and agitation. Heating is induced by heat exchanger 56G and agitation by agitator 126A. The heated, homogenous mixture is discharged at 135 and directed to stage 2.

The foregoing portion of the specification has described in detail the initial delivery, storage, primary settling, and heating stage of the process for separation of grease, solids and water from grease waste. As indicated, the stage 1 process may involve a number of variations. The raw material is batch delivered to a holding tank or a series of holding tanks. The material being processed is then transferred to a heating tank or series of heating tanks in order to heat the solidified grease. From the heating tank or tanks the material is transferred to stage 2 for subsequent processing.

In the second stage, the process stream or streams from stage 1 are subjected to separation preferably in multiple centrifuges resulting in a liquid fraction, a grease fraction and a solids fraction. The liquid may be subsequently treated so it is suitable for discharge into a waste water system.

Turning to FIG. 8, a representative embodiment of the stage 2 treatment is shown and is generally designated by the numeral 200. In FIG. 8, stage 2 processing is shown which receives the discharge from stage 1 which is an agitated mixture of water, grease and solids such as would occur from initial process stage shown in FIG. 7. The mixture is first subjected to screening at screen 202 which is fairly coarse, such as 1/8"-1/2" mesh, which will remove any miscellaneous trash but allow food particles to pass through the screen. The screened liquid is discharged from the screen at 204 and introduced into primary centrifuge 206. Centrifuge 206 is a centrifuge designed for two-phase liquid/solid separation such as a solid bowl-type horizontal decanting centrifuge. A typical centrifuge of this type is shown in FIG. 13. In this type centrifuge, which is a horizontal solid bowl centrifuge, solids below a certain selected size are separated from the stream such as a mixed stream from FIG. 9. The slurry is introduced into the bowl 212 through a feed tube 214 at the center of rotation. The solids are thrown against the wall of the bowl 212. The liquid, being less dense, form a concentric inner layer.

Solids are removed by the screw conveyor 216 at ports 218. The liquid is removed as it overflows weirs at the liquid discharge end 219. The lighter phase, mostly water containing grease, is directed to second stage centrifuge 220 for further separation into grease, water and solids phase. The water is directed to treatment tank 225. Generally treatment consists of PH adjustment by addition of sodium hydroxide or other neutralizing agents at chemical pump 228. Once the PH has been adjusted to a satisfactory range, the neutralized water is substantially free of all solids and grease and can be discharged into a waste water system. Preferably, the system is provided with a PH monitor 230, which in the event the PH in the discharge is not within predetermined parameters, will cause the discharge to waste to be discontinued and/or an alarm to sound.

Solids are discharged at 232 and along with the solids discharged at 218 from centrifuge 206 are directed to a heater/dryer 240. The solids are dried and the drying may be accomplished on a longitudinally extending moving screen 241 which is suspended above a heat source 242 such as a plurality of gas jets. The dried solids are discharged at 248 into a suitable receptacle. The solids may have substantial commercial value usable in animal and pet foods. The highly concentrated grease component is discharged from centrifuge 220 at 222 and delivered to a holding tank 252. Preferably the holding tank is heated by heating element 256 to maintain the contents in a fluid state so the contents may be easily pumped. The concentrated grease has been reclaimed and is suitable for various uses such as in pet foods, animal foods and the like and can be sold for this purpose.

Centrifuge 220 is preferably a disk-type as shown in FIG. 13 for three-phase separation in which feed material enters the bowl 250 at 252. Feed enters the disk stack 254 and centrifugal force throws the solids to the bowl wall to accumulate. The liquid is separated into a heavier phase (water) and a lighter phase (grease) and solids which are separately displaced from the machine at 260, 262 and 264, respectively. Preferably, the unit is a double overflow type with automatic discharge of solids.

FIG. 9 shows a variation of the secondary or stage 2 processes which is generally designated by the numeral 300. The system of embodiment 300 is suitable for treating the grease mixture which has been initially separated into primarily grease and solids containing water such as the separate discharge from the stage 1 process embodiments of FIGS. 1 to 6.

In FIG. 9, the water component is directed to centrifuge 342, which is a decanter-type liquid/solid separation unit (FIG. 12) with a separated liquid discharged at 344. The liquid may be subjected to further liquid/solid separation in disk, bowl-type centrifuge 346 which is liquid/liquid/solid separation unit. Grease from stage 1 is directed to centrifuge 304 which is a three-phase separation unit (FIG. 13). Solids from centrifuges 304, 342 and 346 are all introduced into heater/dryer 350 which dries the solids ready for reclamation. The liquid discharge from centrifuge 304 is conducted via line 355 and introduced into the PH adjustment tank 312. The highly concentrated grease discharged is from centrifuge 304 at 360. Similarly the concentrated grease from centrifuge 346 is discharged at discharge 364 and the grease discharges are both introduced into the grease holding tank 370. Tank 370 may include a suitable heater 372 to maintain the contents in a suitable fluid state for pumping. Although centrifuges of various types are preferred, in some cases filter presses or other types of separation may be used to remove solids.

In FIG. 10, still another second stage treating process is shown which is preferred and designated by the numeral 400. Water-containing solids separated in stage 1 are screened at screen 402 and subjected to centrifuging in decanter-type centrifuge 410. Water is discharged and directed to tank 412 in which pH is adjusted by chemical pump 414 under the control of monitor 416. The discharge may be directed to a sewer or septic system or to a grease trap 425 such as one associated with a truck tank cleaning unit. Solids are discharged as a stream at 430 and directed to heater and dryer 432 and thereafter to storage.

The grease is screened at 440 and subjected to three-phase separation in disk bowl-type centrifuge 442. The separated solids are directed to heater dryer 432 and the water to tank 412. The concentrated grease is directed to tank 450 for reclamation. Tank 450 may be heated by element 452. The separated water is directed to tank 412 for pH adjustment and subsequent disposal.

It will be obvious to those skilled in the art to make various changes, alterations and modifications to the process and apparatus described herein. To the extent such changes, alterations and modifications do not depart from the spirit and scope of the appended claims, they are intended to be encompassed therein.

We claim:

1. A system for separating grease, water and solids from waste grease containing a mixture of such components, said system comprising means for recovering a disposable water component being essentially devoid of grease solids, a commercially reusable solids component and a commercially reusable grease component including:
   (a) a primary holding tank having an inlet for receiving the mixture and providing a predetermined residence time therein, said primary holding tank having a first discharge for water and solids at a first location in said tank and a second discharge for grease at a second location in said tank displaced from said first location; and
   (b) secondary treatment means including first separator means for receiving the first discharge from said first outlet from said primary tank for separating the discharge into primarily water and solid components and second separator means communicating with said second outlet from said primary holding tank for separating the second discharge grease into water, solid and grease components.

2. The system of claim 1 wherein water components discharged from said first and second separator means are directed to a holding tank having means for monitoring the pH and adding chemicals to maintain a predetermined pH.

3. The system of claim 1 wherein said primary holding tank includes heating means for heating at least the grease discharged from said primary holding tank.

4. The system of claim 3 further including heating means for heating the water discharged from said primary holding tank.

5. The system of claim 1 wherein said primary holding tank includes float means adapted to float on a grease layer in said primary holding tank, said float means being in communication with said second grease discharge.

6. The system of claim 1 further including a heater and dryer for receiving the separated solids and heating and drying the same.

7. The system of claim 1 further including screen means for screening the first and second discharge from the primary holding tank.

8. The system of claim 1 wherein said first separation means is a decanter-type centrifuge and said second separation means is a disk bowl-type centrifuge.

9. The system of claim 1 wherein an upper portion of said primary holding tank is provided with a vent communicating with a scrubber.

10. The system of claim 1 wherein said primary holding tank includes liquid level sensing means and pump means which are operatively controlled by said liquid level sensing means to pump grease, water and solids from said holding tanks only when the liquid level is within predetermined limits.

11. The system of claim 1 wherein the mixture is screened prior to introduction into said primary holding tank.

12. A system for treating grease for separating waste grease into concentrated grease, water and solid components, said system comprising means for recovering a disposable water component being essentially devoid of solids and grease, a commercially reusable solids component and commercially reusable grease component including:
 (a) a primary holding tank having an inlet for waste grease to be processed and an outlet, said tank including agitation means for mixing the contents of the tank and heating means for heating the contents of the tank;
 (b) secondary treatment means communicating with the outlet from said primary holding tank, said secondary treatment means including first separator means for separating the discharge from the primary holding tank into substantially liquid and solid components, a dryer receiving the solid components discharged from said first separator means and second separator means receiving the liquid discharged from said first separator means, said second separator means separating the liquid into substantially grease, solid and a water components.

13. The system of claim 12 in which the water component discharged from the second separator means is directed to a pH adjustment system.

14. The system of claim 12 wherein the grease from said secondary treatment means is directed to a holding tank, said holding tank including heating means.

15. A process for separating grease, water and solids from a grease waste mixture of such components, said process comprising means for recovering a disposable water component being essentially devoid of grease, a commercially reusable solids component and a commercially reusable grease component including:
 (a) introducing the grease waste mixture into a primary holding tank and allowing the mixture a predetermined residence time therein to effect primary separation into an upper portion of mostly grease and a lower portion containing mostly water and solids;
 (b) removing the mostly grease portion from the primary holding tank at a first outlet and directing the removed grease to a first separator to further concentrate the grease;
 (c) removing the mostly water and solids portion from the primary tank at a second outlet and directing the mostly solids and water portion to a second separator for separation into separate water and solids portions.

16. The process of claim 15 wherein said first and second separators are centrifuges.

17. The process of claim 16 wherein said solid portions from said second separator are subsequently dried.

18. The process of claim 15 wherein said water from said first and second separators are treated to a predetermined pH.

19. The process of claim 15 wherein said mostly grease portion is heated prior to introduction into the first separator.

20. The process of claim 15 wherein said grease from said first separator is directed to a holding tank for storage and subsequent reuse.

21. The process of claim 15 wherein said grease waste mixture is periodically collected from restaurant grease traps and transported by a tanker to a remote location for separation.

22. The process of claim 21 wherein said tanker includes means for effecting crude separation of the mixture prior to introduction into the primary holding tank.

* * * * *